United States Patent
Masberg et al.

(10) Patent No.: US 6,487,998 B1
(45) Date of Patent: Dec. 3, 2002

(54) DRIVE SYSTEM, PARTICULARLY FOR A MOTOR VEHICLE, AND PROCESS FOR OPERATING IT

(75) Inventors: Ullrich Masberg, Rösrath/Kleineichen (DE); Thomas Pels, Overath (DE); Klaus-Peter Zeyen, Köln (DE); Andreas Gründl, München (DE); Bernhard Hoffmann, Starnberg (DE)

(73) Assignees: ISAD Electronic Systems GmbH & Co., KG, Köln (DE); Gründl ünd Hoffmann GmbH Gesellschaft für elektrotechnische Entwicklungen, Starnberg (DE)

( * ) Notice: Subject to any disclaimer, the term of this patent is extended or adjusted under 35 U.S.C. 154(b) by 0 days.

(21) Appl. No.: 09/032,654

(22) PCT Filed: Aug. 31, 1996

(86) PCT No.: PCT/DE96/01615

§ 371 (c)(1),
(2), (4) Date: Apr. 13, 2001

(87) PCT Pub. No.: WO97/08436

PCT Pub. Date: Mar. 6, 1997

(30) Foreign Application Priority Data

Aug. 31, 1995 (DE) .......................................... 195 32 164

(51) Int. Cl.[7] .............................................. F02B 75/06
(52) U.S. Cl. ................................................ 123/192.1
(58) Field of Search .......................... 123/192.1, 192.2, 123/481, 198 F, 179.25

(56) References Cited

U.S. PATENT DOCUMENTS

| | | | |
|---|---|---|---|
| 2,654,849 A | 10/1953 | Trofimov | 310/99 |
| 2,790,917 A | 4/1957 | Trofimov | 310/102 |
| 3,774,303 A | 11/1973 | Burkett et al. | 30/382 |
| 3,870,116 A | 3/1975 | Seliber | 180/54 R |
| 3,902,073 A | 8/1975 | Lafuze | 290/46 |
| 3,974,396 A | 8/1976 | Schönball | 290/54 |
| 4,025,860 A | 5/1977 | Shibata et al. | 320/3 |
| 4,066,936 A | 1/1978 | Hirota | 318/139 |
| 4,346,773 A | 8/1982 | Hofbauer et al. | 180/165 |
| 4,699,097 A * | 10/1987 | Tanaka et al. | 123/192 |
| 4,797,602 A | 1/1989 | West | 322/10 |
| 4,803,376 A | 2/1989 | N'Guyen | 290/22 |
| 4,883,973 A | 11/1989 | Lakey et al. | 290/31 |
| 4,922,869 A * | 5/1990 | Kadomukai et al. | 123/192 R |
| 4,942,950 A | 7/1990 | Watanabe et al. | 192/0.096 |
| 4,958,095 A | 9/1990 | Uchida et al. | 310/59 |
| 4,982,707 A * | 1/1991 | Maeda et al. | 123/192 B |
| 5,020,401 A * | 6/1991 | Mashino | 123/192 R |

(List continued on next page.)

FOREIGN PATENT DOCUMENTS

| | | |
|---|---|---|
| AU | 58401-73 | 1/1975 |
| DE | 282 671 | 8/1912 |
| DE | 874 713 | 6/1952 |

(List continued on next page.)

OTHER PUBLICATIONS

N. Saridakis, "Golf mit Otto–Elektro–hybridantrieb", ATZ, Atutomobiltechnische Zeitschrift 87 (1985) 11, pp. 581–584.

(List continued on next page.)

*Primary Examiner*—Noah P. Kamen
(74) *Attorney, Agent, or Firm*—Blakely, Sokoloff, Taylor & Zafman

(57) ABSTRACT

The invention concerns a drive system, especially for a motor vehicle, with a multicylinder internal combustion engine, a device for shutting off at least some of the cylinders of the internal combustion engine, and a device for active reduction of rotational nonuniformities, acting in particular on a shaft, such as a drive shaft of the internal combustion engine, or a shaft that is coupled or which can be coupled to it, which is active at least for certain operating states during cylinder shutoff mode. A method of operating such a drive system is also disclosed.

15 Claims, 5 Drawing Sheets

U.S. PATENT DOCUMENTS

| | | | | |
|---|---|---|---|---|
| 5,033,425 A | * | 7/1991 | Kadomukai et al. | 123/192 R |
| 5,053,632 A | | 10/1991 | Suzuki et al. | 290/45 |
| 5,087,869 A | * | 2/1992 | Kuriyama et al. | 322/15 |
| 5,105,776 A | * | 4/1992 | Tsuchiya et al. | 123/192.1 |
| 5,109,815 A | | 5/1992 | Maeda et al. | 123/192.1 |
| 5,125,236 A | | 6/1992 | Clancey et al. | 62/115 |
| 5,126,641 A | | 6/1992 | Putman et al. | 318/128 |
| 5,303,794 A | | 4/1994 | Hrovat et al. | 180/197 |
| 5,323,743 A | | 6/1994 | Kristiansson | 123/179.3 |
| 5,325,042 A | | 6/1994 | Murugan | 322/10 |
| 5,359,308 A | | 10/1994 | Sun et al. | 335/216 |
| 5,431,241 A | | 7/1995 | May et al. | 180/197 |
| 5,497,741 A | * | 3/1996 | Tashiro et al. | 123/192.1 |

FOREIGN PATENT DOCUMENTS

| | | | |
|---|---|---|---|
| DE | 893 299 | 1/1953 | |
| DE | 904 737 | 6/1953 | |
| DE | 938 680 | 6/1954 | |
| DE | 1 077 072 | 3/1960 | |
| DE | 1 156 319 | 10/1963 | |
| DE | 1 165 422 | 3/1964 | |
| DE | 1 284 856 | 12/1968 | |
| DE | 23 45 018 A1 | 4/1974 | |
| DE | 23 53 724 B2 | 5/1974 | |
| DE | 27 04 533 A1 | 8/1978 | |
| DE | 28 55 886 A1 | 6/1979 | |
| DE | 29 02 376 C2 | 7/1979 | |
| DE | 28 23 225 A1 | 11/1979 | |
| DE | 29 17 139 A1 | 11/1980 | |
| DE | 29 43 563 A1 | 5/1981 | |
| DE | 30 09 503 A1 | 9/1981 | |
| DE | 30 13 424 A1 | 10/1981 | |
| DE | 30 48 972 C2 | 7/1982 | |
| DE | 30 50 239 A1 | 10/1982 | |
| DE | 32 30 121 A1 | 2/1984 | |
| DE | 32 30 607 A1 | 2/1984 | |
| DE | 32 43 513 A1 * | 5/1984 | |
| DE | 33 43 018 C2 * | 6/1984 | |
| DE | 32 43 514 C2 * | 9/1984 | |
| DE | 33 35 923 A1 * | 9/1984 | |
| DE | 33 38 548 A1 * | 5/1985 | |
| DE | 35 37 994 A1 | 5/1988 | |
| DE | 37 37 192 A1 | 7/1988 | |
| DE | 38 14 484 A1 | 11/1988 | |
| DE | 37 43 289 A1 | 6/1989 | |
| DE | 38 12 296 A1 | 11/1989 | |
| DE | 39 37 082 A1 | 5/1990 | |
| DE | 39 26 054 A1 | 2/1991 | |
| DE | 40 27 664 A1 | 3/1991 | |
| DE | 39 39 695 C1 | 5/1991 | |
| DE | 40 38 301 A1 | 6/1991 | |
| DE | 40 00 678 A1 | 7/1991 | |
| DE | 41 00 937 A1 | 8/1991 | |
| DE | 40 11 291 A1 | 10/1991 | |
| DE | 41 34 268 A1 | 4/1992 | |
| DE | 42 13 132 A1 | 11/1992 | |
| DE | 41 24 496 A1 | 1/1993 | |
| DE | 42 02 083 A1 | 7/1993 | |
| DE | 42 02 737 A1 | 8/1993 | |
| DE | 42 30 510 C1 | 9/1993 | |
| DE | 42 25 683 A1 | 2/1994 | |
| DE | 43 30 193 A1 | 3/1994 | |
| DE | 43 18 949 C1 | 6/1994 | |
| DE | 43 39 252 A1 | 6/1994 | |
| DE | 43 91 898 C2 | 6/1994 | |
| DE | 43 44 053 A1 | 7/1994 | |
| DE | 43 11 697 A1 | 10/1994 | |
| DE | 43 14 290 A1 | 11/1994 | |
| DE | 43 23 601 A1 | 1/1995 | |
| DE | 43 23 602 A1 | 1/1995 | |
| DE | 44 04 791 C1 | 3/1995 | |
| DE | 44 02 152 C1 | 4/1995 | |
| DE | 295 02 906 U1 | 4/1995 | |
| DE | 44 37 322 A1 | 5/1995 | |
| DE | 44 21 512 C1 | 6/1995 | |
| DE | 44 08 719 C1 | 7/1995 | |
| DE | 44 23 577 A1 | 8/1995 | |
| DE | 44 12 945 A1 | 10/1995 | |
| DE | 44 12 438 C1 | 11/1995 | |
| EP | 0 151 935 A1 | 8/1985 | |
| EP | 0 175 952 A2 | 4/1986 | |
| EP | 0 233 738 A1 | 8/1987 | |
| EP | 0 338 485 A2 | 10/1989 | |
| EP | 0 354 790 A2 | 2/1990 | |
| EP | 0 385 311 A2 | 9/1990 | |
| EP | 0 427 568 A1 | 5/1991 | |
| EP | 0 437 266 A2 | 7/1991 | |
| EP | 0 440 088 A1 | 8/1991 | |
| EP | 0 530 659 A1 | 3/1993 | |
| EP | 0 557 522 A1 | 9/1993 | |
| EP | 0 569 347 A2 | 11/1993 | |
| EP | 0 604 979 A2 | 7/1994 | |
| EP | 0 612 928 A1 | 8/1994 | |
| FR | 2481656 | 11/1981 | |
| FR | 2563280 | 10/1985 | |
| GB | 20 42 772 A | 9/1980 | |
| JP | 55005454 | 1/1980 | |
| JP | 58-126434 A * | 7/1983 | 123/192.1 |
| JP | 58126434 | 7/1983 | |
| JP | 59184020 | 10/1984 | |
| JP | 61-61923 A * | 3/1986 | 123/192.1 |
| JP | 61-61926 A * | 3/1986 | 123/192.1 |
| JP | 61-61927 A * | 3/1986 | 123/192.1 |
| JP | 61-66820 A * | 4/1986 | 123/192.1 |
| JP | 61-661919 A * | 4/1986 | 123/192.1 |
| JP | 61066820 | 8/1986 | |
| JP | 61200333 | 9/1986 | |
| JP | 62166749 | 7/1987 | |
| JP | 1118571 | 5/1989 | |
| JP | 1190922 | 8/1989 | |
| JP | 4024156 | 1/1992 | |
| JP | 05211258 | 8/1993 | |
| JP | 07105943 | 4/1995 | |
| WO | WO 88/08636 | 11/1988 | |
| WO | WO 91/16538 | 10/1991 | |
| WO | WO 94/19856 | 9/1994 | |
| WO | WO 95/02758 | 1/1995 | |
| WO | WO 95/24072 | 9/1995 | |

OTHER PUBLICATIONS

H. Baumann, Siedekühlgefäβ mit Luftrückkühlung für Traktionsstromrichter hoher Leistung:, etzArchiv, vol. 11, 1989, No. 7, pp. 213–220.

E. Blessmann, *"Magnetic Couplings", Machine Design*, Feb. 9, 1989, pp. 105–108.

Robert Bosch GmbH, "Kraftfahrtechnisches Taschenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumirchterantrieben" etz, vol. 114, 1993, No. 17, pp. 1060–1067.

W. Geiβler, F. Unger–Weber: "Modelling the Tree–Phase Propulsion System of a Modern Multisystem–Locamotive", EPE Firenze, (1991), pp. 4–632–4 637.

G. und H. Häberle, "Elektrische Maschinen in Anlagen der Energietechnik", Verlag Europa–Lehrmittel, Haan–Gruiten, 3. Auflage, 1994, Seiten 169–172.

G. Henneberger, "Elektrische Motoraustrüstung", Braunschweig, 1990, pp. 98–103.

J. Langheim, J. Fetz: "Electric Citybus with two Induction Motors–Power Electronics and Motor Control", ETEP, vol. 2, No. 6, Nov./Dec. 1992, pp. 359–365.

"Kraftfahrzeugtechnik" 11/82, pp. 346–347.

Litton prospect "Bürstenloser Hohlwellen–Resolver SSBH–15", Unterföhring.

J. Heinert et al., "Digital Control and Optimization of a Rolling Rotor Switched Reluctance Maching", IEEE Transactions on Industry Applications, Vo. 31, No. 2, Mar./Apr. 1995, pp. 338–344.

F. Simovert, "Spannungszwischenkreis–Umrichter Baureiho 6SC44. der Fa. Siemens AG", 1985, No. A 19100–E319–A262.

D. Teodoroscu, "Kleinantriebe mit Vollpolläufer–Synchronmotoren", ema, 5/93, pp. 39–43.

* cited by examiner

DRIVE SYSTEM, PARTICULARLY FOR A MOTOR VEHICLE, AND PROCESS FOR OPERATING IT

BACKGROUND OF THE INVENTION

1. Field of the Invention

The invention concerns a drive system, especially for a motor vehicle.

2. Description of the Related Art

The invention concerns a drive system, especially for a motor vehicle.

The internal efficiency of internal combustion engine (especially an internal combustion engine with external mix formation; and external ignition) falls off sharply at low effective cylinder mean pressures, and this drop-off is especially pronounced at low rotary speeds. Therefore, high-power engines work only with a relatively poor efficiency when little power is demanded of them relative to their maximum performance—i.e., their effective mean pressure is low.

In order to enhance the efficiency, it has been proposed to shut off individual engine cylinders in such operating conditions; see, for example, "Automotive Engineering Handbook," published by Robert Bosch GmbH, Düsseldorf, 21st Ed., 1991, p. 361. For shutting off cylinders produces a distinct increase in the effective mean pressure in the cylinders not shut off, thus providing a substantial increase in efficiency (indeed, by as much as 30%). Therefore, shutting off cylinders can contribute to an economical use of raw materials and a lessening of the environmental burden of toxic, climate-active, or otherwise harmful exhaust gases.

A switching off of all cylinders of an internal combustion engine in pushing operation is known, for example, from DE-A-38 14 484 (MAI).

The following more remote state of the art shall also be indicated hereafter

The following publications are oriented to devices for active dampening of rotational nonuniformities:

Patent Abstracts of Japan, Vol. 11, No. 28 (M-557), Jan. 27, 1987 and JP-A-61 200 333 (NISSAN I), Patent Abstracts of Japan, Vol. 4, No. 29 (M-002), Mar. 14, 1980 and JP-A-55 005 454 (TOYOTA), EP-A-0 427 568 (ISUZU), DE-A-40 38 301 (HITACHI/NISSAN), EP-A-0 440 088 (NISSAN II), DE-A-32 30 607 (VW I), EP-B-0 175 952 (MAZDA), Patent Abstracts of Japan, Vol. 7, No. 240 (M-251), Oct. 25, 1983 and JP-A-58 126 434 (NISSAN II) and DE-A-41 00 937 (FICHTEL & SACHS).

DE-A-29 02 376 (IVANOV) discloses a device for active dampening of linear oscillations.

EP-A-0 437 266 (MAGNET MOTOR) and DE-B-23 53 724 (HELLING) disclose flywheel accumulators for hybrid vehicles.

DE-A-44 37 322 (VW II) discloses the use of an electric machine as a vehicle brake in an electric or hybrid vehicle.

DE-A-42 25-683 (PFEIFFER) discloses a drive slip control for a rail vehicle

DE-A-32 43 513 (VW ) discloses an electric machine in whose vicinity a coupling is situated.

DE-A-33 38 545 (VW IV) and DE-A-44 08 719 (VW V) disclose electromagnetic couplings.

The invention aims at further developing drive systems with cylinder shutoff.

It accomplishes this goal with a drive system, in particular for a motor vehicle, with:

a multicylinder internal combustion engine;
a device for switching off at least some of the cylinders of the internal combustion engine; and
a device for active reduction of rotational nonuniformities, which is active at least during cylinder shutoff operation in at least certain operating conditions (claim 1). Preferably, the device acts on a shaft, say, the drive shaft of the internal combustion engine or a shaft that is coupled or can be coupled to it (claim 2).

The term "cylinder shutoff" is understood here in a broad sense, which embraces all possibilities of operating one or more cylinders no longer actively driving (and no longer using up fuel). This is preferably accomplished by a fuel and possibly an ignition cutoff of the corresponding cylinder, which can be supplemented by a so-called valve shutoff in order to reduce the gas exchange process. Theoretically, a mechanical shutdown of the particular cylinder(s) is also possible. In the literature, the term "cylinder shutoff" is also often understood in a narrow sense, namely, in the sense of only the last-mentioned mechanical shutdown, as in the already mentioned "Automotive Engineering Handbook". But this narrow understanding departs—as mentioned—from the broad understanding employed herein. A special instance—likewise included herein—is the shutting off of all cylinders of the internal combustion engine in pushing operation. By "multicylinder" is meant, for example, the following numbers of cylinders: 2, 3, 4, 5, 6, 7, 8, 12. The shaft on which the device for reduction of rotational non-uniformity acts is, e.g., the crankshaft itself, namely, its stump at the takeoff side, or a blind stump not transmitting any drive torque. As an alternative, the device can act on a shaft of the drive train, e.g., the drive shaft leading to the transmission at the drive end.

In the state of the art—as already mentioned—there are proposals for devices for active reduction of rotational nonuniformities for internal combustion engines. Their action is based on generating an alternating torque, or also one only pulsating in one direction, which is directed opposite the rotational nonuniformities and which thereby reduces them. Some of these proposals are addressed to the dampening of rotational nonuniformities which occur when idling, such as ISUZU I and HITACHI/NISSAN.

Modem internal combustion engines, such as those used for passenger cars, usually have relatively slight rotational nonuniformities. In practice, therefore, the above proposals have found little application for active dampening of rotational vibration.

SUMMARY OF THE INVENTION

The invention concerns a drive system, especially for a motor vehicle, with a multicylinder internal combustion engine, a device for shutting off at least some of the cylinders of the internal combustion engine, and a.,device for active reduction of rotational nonuniformities, acting in particular on a shaft, such as a drive shaft of the internal combustion engine, or a shaft that is coupled or which can be coupled to it, which is active at least during cylinder shutoff mode, at least for certain operating states. The invention is also addressed to a method of operating such a drive system.

BRIEF DESCRIPTION OF THE DRAWINGS

The invention shall now be explained more closely by means of sample embodiments and the enclosed schematic drawing. The drawing shows.

DETAILED DESCRIPTION OF THE EMBODIMENTS

Figure 1A:
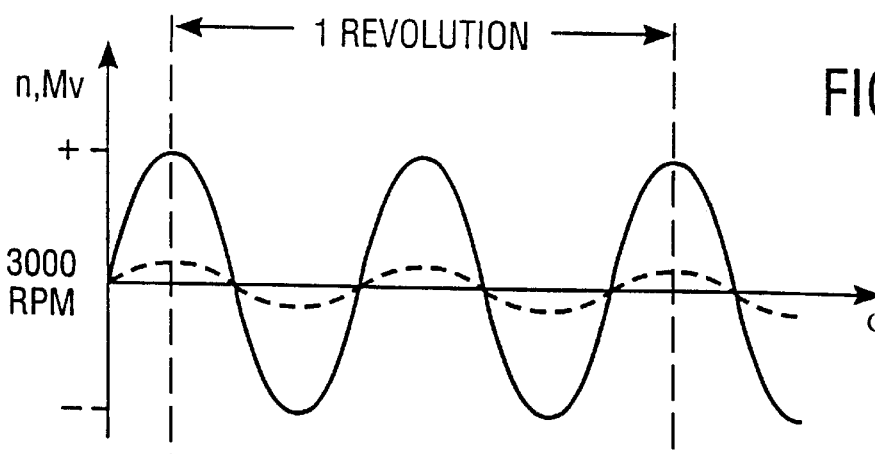
FIG. 1 is a schematic sample representations of the functioning of the system for active reduction of rotational nonuniformities.

The invention begins with the knowledge that, in a motor with high uniformity in its rotational behavior, large rotational nonuniformities can result in cylinder shutoff operation, especially because of the following reason: rotational nonuniformities in a piston engine are primarily caused by the gas and mass forces of the individual pistons acting on the drive shaft (crankshaft). For example, in a four-cylinder four-stroke rotor, rotational nonuniformities occur in the second order (i.e., twice the rotary frequency of the motor); correspondingly, in a six-cylinder four-stroke motor, they occur in the third order. Moreover, there are rotational nonuniformities of higher order, as well as stochastically occurring nonuniformities. Motors are generally designed such that the mass forces and (mean) gas forces partly compensate for themselves. When cylinders are switched off by fuel and perhaps valve shutoff, the gas forces virtually disappear, so that this compensation effect is also eliminated. The mass forces now occur without compensation in the cylinders which have been switched off (to the extent they are not halted). The result is large rotational nonuniformities, which may cause troublesome noise and vibration, increased wear and tear, and less comfort. Rather large rotational nonuniformities can also occur when cylinders are shut down.

The invention allows a lessening of these rotational nonuniformities which occur more intensely in cylinder shutoff operation. Thus, it makes a cylinder shutoff practically possible already in the case of four-cylinder motors (e.g., shutoff of two cylinders).

The device for active reduction of rotational nonuniformities can be active in the cylinder shutoff and turn on mode, either permanently or only in certain operating states of the internal combustion engine (e.g., only below a particular rotary speed or not during acceleration and deceleration processes). If necessary, the strength with which it acts on the drive shaft can distinguish between shutoff and turn on mode. Alternatively, it can be active only during cylinder shutoff mode, in which case, once again, a permanent activity or one limited to certain operating states of the internal combustion engine is possible.

The drive system according to the invention has the following advantages:

it has less rotational nonuniformity in the cylinder shutoff mode;

it therefore results in less noise and vibration, and has reduced wear and tear;

it makes a cylinder shutoff practicable even with four-cylinder motors and, in certain cases—such as six-cylinder motors with shutoff down to three cylinders—it makes this possible for the first time;

by virtue of these properties, it can contribute to a greater dissemination of drive systems with cylinder shutoff and, thus, a reduction of raw material consumption and environmental pollution and thus represents an important step toward the so-called three-liter automobile.

Basically, the device for active reduction of rotational nonuniformities can be controlled such that its rotational nonuniformity-diminishing effect depends on whether cylinder shutoff or turn on mode is present. For example, if one assumes that the rotational nonuniformities in the turn on mode are half as large as in shutoff mode, then it might be controlled such that it almost completely suppresses the rotational nonuniformities in the turn on mode, while it reduces them in the shutoff mode. Advantageously, however, it follows the change in the rotational nonuniformities, i.e., upon switching from cylinder shutoff to turn on mode and/or back it alters its reducing action, generally by a change in phase and amplitude of the torque applied for the reduction. In this way, rotational nonuniformities can be almost completely suppressed in both shutoff mode and turn on mode.

Since—as mentioned—the rotational nonuniformities are generally greater in shutoff mode than in turn on mode, the reduction effect preferably increases upon switching from cylinder turn on to cylinder shutoff mode and decreases in the other direction.

If the device for active reduction of rotational nonuniformities is controlled by detecting the actually occurring rotational nonuniformity solely on the basis of an automatic feedback control, the feedback control can also theoretically provide for a corresponding change in the reduction effect when switching from cylinder turn on to cylinder shutoff mode and/or vice versa.

However, in order to preclude a control delay during these transitions and to provide the quickest possible change in reduction effect, the control information used to control the transition from cylinder turn on to shutoff mode and/or vice versa preferably produces the change in the reduction effect. For example, in a device for active reduction of rotational nonuniformities controlled by a characteristic diagram, the control signal producing the shutoff and turn on of the cylinders can also produce a switching between two (possibly adaptive) characteristic diagrams, one of which contains information on the (anticipated) rotational nonuniformities during shutoff mode and the other such information during turn on mode. In a servo-controlled automatic feedback control, the control system can also be used for an appropriate servo-control, dependent on the cylinder shutoff or turn on condition, in order to avoid a delay in the control system.

In the area of private motor vehicles, there is resistance to drive systems with cylinder shutoff on the part of many users, because they do not like the feeling of driving at times with only a "three-cylinder engine", instead of a six-cylinder engine, for example. Therefore, the drive system is advantageously configured such that the cylinder shutoff mode and transitions into and out of cylinder shutoff mode are essentially unnoticeable to the user (as regards the user's perceptions resulting from rotational nonuniformities, such as the corresponding noise and vibration; slight differences in the exhaust noise, for example, might remain). This is achieved by such a control of the rotational nonuniformity reduction effect that the remaining rotational nonuniformities are practically the same in turn on and shutoff mode, at least during the transitions (while a vanishing of the rotational nonuniformities during the transitions is preferable).

Advantageously, the device for active reduction of rotational nonuniformities comprises at least one electric machine, especially a rotary-field or traveling wave machine, which is coupled or can be coupled to the drive shaft.

An "electric machine" is any kind of machine for rotational movement, which can be operated as both an electric motor and an electric brake, or a generator if necessary.

In theory, the coupling of the electric machine to the shaft can be indirect, e.g., through a transmission. Preferably, however the coupling is direct, in which, for example, the rotor of the electric machine—similar to a flywheel—is mounted directly on the drive shaft of the drive assembly or perhaps an extension of this shaft that can be coupled in and is preferably coupled or can be coupled filmy to it.

By "rotary-field machine" —in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments (sectors). Thus, for example, the traveling-wave machine can be an induction or synchronous machine whose stator extends only across one or more sectors of the rotor—resembling one or more curved linear motors.

The drive system preferably has at least one inverter for generating the voltages and/or currents of variable frequency, amplitude and/or phase required for the magnetic fields of the electric machine. The inverter can generate the voltages and/or currents needed for the magnetic fields (in particular, rotary or traveling fields) with any desired (within certain limits) frequency, amplitude or phase, or any desired combination of these quantities. It can do this advantageously by means of electronic switch from a predetermined dc or alternating voltage or a predetermined direct or alternating current (so-called pulse inverter). To special advantage, all three quantities—frequency, amplitude and phase—are freely selectable. An inverter drive has the advantage, among others, of effectively reducing the most diverse rotational nonuniformity with high variability during the most diverse operating conditions and almost totally suppressing it in many instances, being able to easily produce a desired superpositioning of an additional torque with the desired strength, when necessary.

Basically, the device (i.e., in particular, the electric machine) can be controlled such that it either counteracts only rotational nonuniformities tending to speed up (so called positive rotational nonuniformities) or those tending to slow down (so-called negative rotational nonuniformities). However, a mode of operation is especially effective in which it counteracts both negative and positive rotational nonuniformities.

In this case, the device is preferably controlled such that it produces a rapidly alternating torque, namely, a braking torque for al positive rotational nonuniformity and a driving torque for a negative rotational nonuniformity, onto which it can advantageously superimpose, at least some of the time, a positive or negative torque (extra torque) to further achieve a driving action or a braking ore generator-type action For configurations in which the electric machine also acts as an electromagnetic coupling, a rapidly varying coupling slip of larger or smaller magnitude can take the place of the rapidly alternating braking and driving torque.

By "rapid variation" is meant a variation in the frequency range of the rotational nonuniformity being reduced, i.e., for the second-order rotational nonuniformity at a rotary speed of 3000 rpm (in more contemporary terminology expressed as $min^{-1}$) a variation with a frequency of 100 Hz. On the contrary, the possibly superimposed additional torque generally varies slowly or is constant—apart from, possibly steep edges at the beginning or end of the superpositioning.

Thanks to the (especially additive) superpositioning of the additional torque in the desired direction and strength, the reduction of the rotational nonuniformity and the generation of the additional torque are decoupled from each other. The rapidly varying torque is practically unchanged in its course by the superpositioning, being only shifted relative to the zero line. As an exception, the rapidly varying torque changes only if the internal combustion engine actually shows an altered rotational nonuniformity on account of the change in load accompanying the switching in of the additional torque.

If the additional torque being furnished at the moment is smaller than the amplitude of the alternating torque at that time, the combined torque of the electric machine shows alternately positive and negative values—albeit shifted with respect to the zero line. If, on the other hand, it is larger than such, the combined torque is only positive or negative, and its magnitude contains a rapidly varying component. An additional braking torque can serve to make the electric machine diminish the coupling slip, perform a braking synchronizer function, act as a generator for current supply and/or produce or sustain a braking of the vehicle and/or reduce the slip of a drive wheel by braking, perhaps as part of an antislip control. The braking energy (additional torque brake energy) obtained when using these brake functions as a generator can be saved up—like that resulting from rotational nonuniformity—(for example, in an electrical accumulator or in a flywheel accumulator) and later used as drive energy or be furnished to a power grid or, for example, the vehicle's battery. An additional drive torque can serve an accelerating synchronizer function or sustain (when the electric machine functions as a "booster") or produce an acceleration of the vehicle, for example, to cover acceleration gaps, as in the case of a turbocharged engine.

In order to achieve the highest possible overall efficiency of the drive system, the energy obtained when reducing a positive rotational nonuniformity (rotational nonuniformity brake energy) and possibly the energy obtained from the additional braking torque (additional torque brake energy) is advantageously at least partially saved up and the saved rotational nonuniformity brake energy is at least partially used later on to reduce a negative rotational nonuniformity.

The saving up of the rotational nonuniformity brake energy and possibly the additional torque brake energy can be done in particular by an electrical accumulator and/or a mechanical accumulator (flywheel accumulator): the electrical accumulator can be, in particular, a capacitance, an inductance of a (fast-acting) battery. Advantageously, the inverter (if present) is an intermediate-circuit inverter, whose intermediate circuit has at least one electrical accumulator for brake energy or is coupled to at least one such accumulator. The accumulator can either serve exclusively for the accumulation of brake energy (in this case, it will be switched in generally in addition to a normally present intermediate-circuit accumulator, which can furnish the necessary voltage or current pulse during the inverter's operating cycle), or it can serve only partially for the accumulation of the brake energy, i.e., save up yet other energy—which may be needed for the operating cycle (in the latter case, it could coincide with the usual intermediate accumulator). Moreover, it may be advantageous in any case to design the rectifier as an intermediate-circuit rectifier—for example, even without intermediate accumulation of brake energy.

By an "intermediate circuit" is meant a circuit which can supply essentially dc voltage or direct current, from which an inverter component (the so-called machine inverter) can form variable alternating voltage or current by pulse or cycle operation. This dc voltage or direct current must be able to provide voltage or current pulses with extreme edge steepness and at high voltage or current level. Generally speaking, an intermediate-circuit inverter comprises three subassemblies, namely, an input subassembly for supplying or taking away electrical energy, an output subassembly in the form of the machine inverter, and the intermediate circuit which comes between these.

In a flywheel accumulator, the flywheel can preferably be electrically coupled via a (second) electric machine to the device for active reduction of rotational nonuniformity. This can be, for example, a rotary-field or commutator machine controlled by its own rectifier. The device for reducing the rotary nonuniformity and the flywheel machine work in opposite cycle: when the former is braking, the latter is accelerating the flywheel, and when the former is driving or not braking so much, the latter is braking the flywheel. Relatively high energy densities can be built up with such a flywheel energy accumulator.

The (first) electric machine, in addition to the active reduction of rotational nonuniformity, can also perform other functions at the same time or staggered in time and thus replace machines which are traditionally specialized in these functions. In particular, it can also have the function of a starter for the internal combustion engine coupled to the shaft, and/or the function of a generator for electricity supply, e.g., to charge a battery or energize a power grid. During the starting process, it is generally not necessary to reduce rotational nonuniformity; for this, the electric machine will be operated temporarily as a pure electric motor. Preferably, it works as a direct starter, i.e., it is cirectly (no transmission) coupled or can be coupled to the drive shaft of the internal combustion engine and is configured such that it can start the engine by merging in from standstill. On the other hand, the generator function is generally also desirable when reducing rotational nonuniformity. Averaged out over time, a gain in electric energy is achieved by superimposing the rapidly varying torque with a simultaneously braking torque.

In corresponding manner, the device for reducing rotational nonuniformity, i.e., in particular, the electric machine, can also produce or sustain an acceleration and/or braking of the shaft as an additional function. For example, this can serve to accelerate a motor vehicle, along with the drive assembly. For braking a vehicle, the electric machine can serve as a wear-free, possibly generator-type brake or extra brake. In combination with an antislip control, the electric machine can quickly reduce the total drive torque and, thus, the slip of one or more drive wheels by braking. In electromagnetic coupling function, the drive wheel slip can be reduced by increasing the coupling slip, instead of by braking. When performing these additional functions, it is possible to switch off the function of reducing the rotational nonuniformity, or both functions can be implemented at the same time, by superimposing an appropriate driving or braking torque—as explained above.

The brake energy obtained when employing these additional functions can be saved (e.g., in the electric accumulator or in the flywheel accumulator)—like that resulting from rotational nonuniformity—and later used as drive energy or be supplied to a network or, for example, the car battery. In order to achieve the highest possible efficiency of brake energy recycling when braking the vehicle by means of the electric machine, it is advantageous to separate the electric machine from the drive assembly by means of an intervening, e.g., mechanical coupling during braking.

In order to supply high-power consumers, such as auxiliary machines (air conditioners, servo-drives, pumps and heating systems), it is advantageous that the electric machine furnish current at relatively high voltage level, preferably in the upper part of the low voltage region, where no special electrocution protection measures are necessary (e.g., around 60 V dc voltage), and that the high-power consumers be electrically (instead of mechanically, as heretofore, or through waste heat) operated or heated at. This high voltage level. If one goes beyond this, a range of 250–450 Volts is preferably selected. Such high voltage levels can already exist, in particular, in the intermediate circuit of an intermediate-circuit inverter, and thus need not be specially generated for this additional purpose. For low-power consumers, a traditional low-voltage network (12 V or 24 V) can also be provided.

The active reduction of rotational nonuniformity—as mentioned—is based on the fact that the device can counteract positive and negative rotational nonuniformity, and thus acts as a brake for positive and as a drive for negative rotational nonuniformity. For this, a control device requires information about the time and possibly the magnitude of a positive or negative rotational nonuniformity.

One possibility of obtaining this information lies in a measuring of the momentary rotational nonuniformity or another quantity connected to it. If the operation of the electric machine is based on this information, we have an automatic (feedback) control, since the actual presence of a rotational nonuniformity leads to an immediate action on this rotational nonuniformity.

Another possibility—also already mentioned—is to use not the actual, but rather an expected rotational nonuniformity as information for operating the device. Thus, we have here a (nonfeedback) control. For example, in an internal combustion engine, one can determine the magnitude and direction of the momentary rotational nonuniformity as a function of the (crank) shaft angle, the number of cylinders switched off, and one or more operating parameters (such as rotary speed and throttle valve position) by using a prototype or simulation on a computer and outfit each mass produced engine with this information saved in the form of a characteristic diagram. During operation, the system then measures the momentary crankshaft angle present, the number of cylinders switched off, and the other operating parameters (such as rotary speed and throttle valve position), reads the corresponding memorized, diagram values for magnitude and amplitude of the anticipated rotational nonuniformity, and controls the device accordingly through the control device in order to counteract the rotational nonuniformity.

Furthermore, an adaptive control is possible, i.e., a (nonfeedback) control in which the control information is not fixed, but rather defined or at least modified by measuring earlier rotational nonuniformities.

Moreover, mixed forms of the mentioned kinds are possible, e.g., the expectation values memorized in a characteristic diagram may be adaptive with respect to an anticipated quantity (such as the amplitude), while they can be fixed with respect to another expected quantity (say, shaft angle). A very advantageous combination is an automatic control with servocontrol, in which the automatic control in each control interval is first adjusted to an expected rotational nonuniformity value from a characteristic diagram (servocontrol) and then works off the generally slight deviations between the actual value and the preset value (automatic control). This type of control provides a very fast and exact regulation with relatively low expense. It may also be advantageous to work with automatic (feedback) control at low speeds (e.g., idling), and to switch to open-loop (nonfeedback) control at higher speeds. All these types of control can employ the information for control of the cylinder shut-off or turn-on operation, as already mentioned above.

In automatic control, adaptive open-loop control, and corresponding mixed forms, the metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring. In an internal combustion engine, this quantity can advantageously be the gas pressure in one or more engine cylinders. For the gas pressure is a major variable source of rotational nonuniformities. Furthermore, another important, practically unchangeable source should be taken into account— the mass forces. Their magnitude can be permanently saved in a characteristic diagram. As an alternative (or supplement), the momentary torque of the engine can be measured, e.g., by means of a torque hub. Thus, using the gas pressure and/or the momentary torque as a metered quantity enables a relatively simple and fast automatic control, adaptive open-loop control, or corresponding mixed form. The gas pressure and/or the momentary torque can also be a useful quantity for controlling the engine and cylinder shut-off.

The electric rotary-field machine or traveling-wave machine of the drive system is preferably an induction machine, a synchronous machine, or a reluctance machine, especially for three-phase current. An induction machine generally has a relatively simple rotor (generally a rotor with short-circuit windings or windings whose ends go to slip rings). On the other hand, synchronous machines (they have rotors with distinct magnetic poles, such as permanent magnets or electromagnets, which are energized with current through slip rings, for example). [sentence incomplete in original] Reluctance machines belong to the synchronous machines in the broad sense. In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator,r current is broken down into a torque-forming component, which generates the torque with the rotor flux, and a component perpendicular to this, generating the machine flux, thus determining the torque.

The device for active reduction of rotational nonuniformities is generally an auxiliary device, which is arranged, for example, in the drive train of a motor vehicle with the drive assembly (internal combustion engine). Because of its auxiliary nature, it should take up little space relative to the drive assembly, and therefore should be as compact as possible. The advantageous measures mentioned hereafter serve such a compact construction—besides other advantageous purposes.

One step for achieving good compactness is for the electric machine to have a fine pole division, in particular, at least one pole per 45° angle of the stator. In a full-circle (360°) rotary-field machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between motor and generator operation and reactive power must be continuously consumed with concomitant pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, advantageously, has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. A very effective cooling technique consists in placing the machine entirely under cooling in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power.

Quantitatively, the compactness can be expressed in terms of the "torque density". Preferably, the electric machine has a high torque density—as compared to the maximum torque—which is especially preferably greater than 0.01 Nm/cm .

Radial vibrations can also often occur on a shaft with rotational nonuniformities, especially the on crankshaft. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve, for example by means of a synchronized voltage, the most precise sinusoidal current to generate the electrical rotary fields or traveling waves, the inverter here preferably works at least sometimes with a higher cycle frequency, in particular, 10 kHz to 100 kHz or more. This provision is also advantageous for achieving a high temporal resolution for the system; for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high cycle frequency, moreover, also has the advantage of enabling a compact construction for the inverter itself: since, for example, in a voltage intermediate-circuit inverter, the capacitance in the intermediate circuit, which provides the intermediate circuit voltage for the electronic switches of the inverter, is inversely proportional to the frequency, so that a smaller capacitance will suffice for this at higher cycle frequency. The smaller intermediate circuit capacitors can be placed directly next to the electronic switches with short conductor pathways. Moreover, a necessary EMC filtering (EMC: electromagnetic compatibility) of the inverter can be externally more compact, since the size of the filter is inversely proportional to the cycle frequency.

As a further advantageous provision for achieving a compact construction of the inverter, electronic switches of the inverter are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the inverter without any cooling body. Furthermore, it has the advantage that relatively slight temperature differences are enough to achieve even high cooling performance: whereas in the case of air cooling a temperature difference of 40° C. is usually necessary between cooling surface and the housing of a chip being cooled, here a difference of 2–10° C., especially around 5° C., is already enough. As a result, high ambient temperatures are tolerable, for example; an ambient temperature up to 60° C. for a chip temperature of 65° C. The absence of cooling bodies and the compactness which can be achieved furthermore allows good jolting resistance; moreover, the boiling bath enables the creation of an oxygen-free atmosphere in the region of the electronic components of the inverter, which generally tends to extend the lifetime. The housing which forms the cooling space—if it is made of conducting material—can also serve as shielding. Electrical intermediate circuit accumulating elements for providing the voltage or current to be synchronized can be arranged inside the cooling housing, thus enabling short conductor lengths. A separate electrical brake energy accumulator, if necessary, can be arranged inside or outside the cooling housing. In the latter case, the possibly relatively high lead inductances are not a problem, since the brake energy accumulator operates on a relatively "slow" time scale.

Another advantageous cooling technique consists in connecting several electronic switches of the inverter, especially 2–20 or more, in parallel. The parallel circuit yields a distributed arrangement of heat sources and, thus, a relatively low loss power density.

The inverter preferably contains semiconductor elements as switches, preferably fast semiconductor'switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more. MOS field effect transistors have the relatively lowest losses at high clock frequencies. They have an ohmic characteristic (whereas other semiconductor elements generally have a fixed loss characteristic), so that the losses are relatively low in partial load operation.

The inverter generates the voltages and/or currents necessary for the magnetic fields of the electric machine, preferably through pulses, especially on the basis of pulse width or pulse amplitude modulation. With constant intermediate circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an inverter with variable intermediate-circuit voltage and thus generates pulses of different amplitudes.

In order to identify the instantaneous angular position of the shaft at any time in the system, the device (i.e., in particular, the electric machine) or the shaft is advantageously outfitted with a rotor position or shaft position pickup. From the information on the instantaneous angle position, a conclusion can be drawn as to the instantaneous angular velocity and acceleration and, thus, the instantaneous rotational nonuniformities. In an automatic control system, the reduction of the rotational nonuniformity can be based on this information—as explained above. In an open-loop control system, the information on the instantaneous angle position and possibly the instantaneous mean rotary speed is used to read out the correct expectation value from the characteristic diagram. To obtain the most precise angle position information possible, a rotation transformer (so-called "resolver") can be used in particular, i.e., a transformer with translation ratio dependent on angle. High-resolution encoders can also be used for this purpose, e.g., a combination of a high-resolution incremental pickup and a simple, absolute pickup.

Traditionally, one uses friction-closing couplings in drive systems of motor vehicles, which allow a starting of the vehicle with torque transformation ("grinding clutch") in the starting phase. A further task consists in allowing a gear shifting by separating the drive assembly (here, that of the engine) from a shift transmission and subsequently reconnecting to a friction-operated rotary speed adjustment of drive assembly and transmission. Moreover, hydrodynamic couplings are known, some of them with transformer functions.

Instead of or in addition to such couplings, the electric machine can advantageously be configured such that it acts as an electromagnetic coupling in the drive train and/or as an active transmission synchronization device or a portion thereof In an "electromagnetic coupling", the transmission of moment through the coupling occurs by electrical, magnetic, or electromagnetic forces. It is possible for this type of force transmission to be present only temporarily. For example, after attaining the same rotary speed for the shafts being coupled, the force transmission can be taken over by a mechanical coupling.

In one advantageous configuration, for example, the drive shaft coming from the internal combustion engine can be coupled to the rotor, and the takeoff shaft leading to the transmission can be coupled to the stator, which is mounted so that it can rotate in this configuration (or with the positions of rotor and "stator" reversed). The machine corresponds, e.g., to a normal machine with rotor and stator, which can also rotate as a whole in addition to the rotor rotation. The machine, able to rotate as a whole, can generate positive and negative relative torques between rotor and "stator." In this way, any desired (even vanishingly small) coupling slip can be adjusted, and an active acceleration or braking of the shaft leading to the transmission can be achieved for purposes of transmission synchronization.

The electromagnetic coupling function can also be used advantageously for a modified form of starting. In fact, relatively large torques need to be provided for direct starting of the drive assembly. As an alternative, for the case of smaller torque not sufficient for this, the electric machine can be advantageously designed as a gyrating mass starter with electromagnetically coupled gyrating mass. The gyrating mass is advantageously the rotor or the "stator", possibly together with the connecting shaft leading to the transmission. With the gear disengaged, this can be run up to high speed as an electric motor, buttressed by the inertia of, the drive shaft and the compression of the engine. By electromagnetic coupling by means of the electric machine itself, the gyrating mass is quickly braked, thus accelerating the drive shaft such that the engine turns over. The advantage over known flywheel starters with mechanical coupling of the flywheel (see, e.g., the book by D. Henneberger "Electrical Engine Equipment", Braunschweig 1990, pp. 98–103) is the avoidance of clutch wear and the precise controllability of the coupling process.

The invention is also addressed to a method for operating a drive system, especially for a motor vehicle, wherein the drive system comprises
- a multicylinder internal combustion engine;
- a device for switching off at least some of the cylinders; and
- a device for active reduction of rotational nonuniformities—especially coupled or able to be coupled with a shaft, such as the drive shaft of the engine,
- wherein the drive system is operated such that the device for active reduction of rotational nonuniformities is active at least during cylinder shut-off mode, at least during certain operating states. The method can advantageously be implemented with a system according to one or more of the above-explained embodiments. As regards individual features and advantages of the method, refer to the above explanations about the system, which also pertain in their entirety to the method in its various embodiments.

The subjects subjects mentioned in the specification, can also be advantageous in a drive system or method for operation of a drive system without cylinder shut-off. We therefore reserve the right to orient patent claims to these subjects, omitting the features now pertaining to the cylinder shut-off in the claims.

Furthermore, in all of the present specification, numerical indications "x" shall be understood in the sense of "at least x", and only preferably in the sense of "exactly x".

In the figures, parts essentially identical in function bear the same references.

FIG. 1a shows (by solid line) the rotary 'speed n of a shaft as a function of the crankshaft angle φ. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal.

There are fluctuations in the torque Mv of the engine about a mean torque, basically proportional to the rotational nonuniformities. The solid line in FIG. 1a also illustrates the curve of the engine torque Mv as a function of the crankshaft angle φ.

Figure 1B:
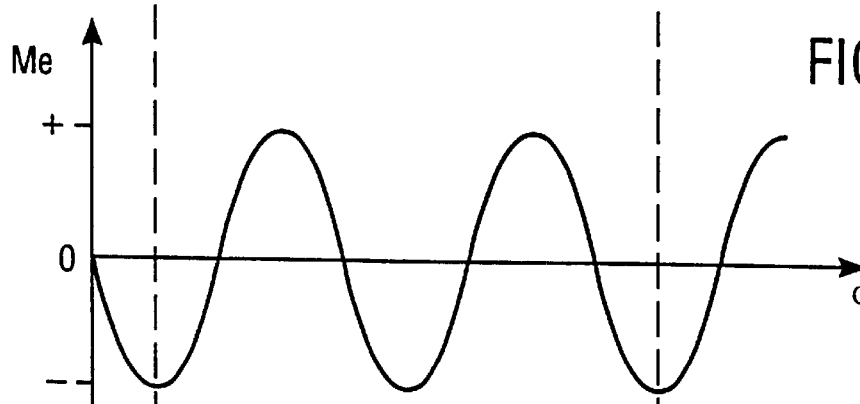

FIG. 1b shows the total torque Me as a function of the shaft angle φ, which is applied by an electric machine coupled to the shaft. The curve of the machine torque Me largely corresponds to that of the rotational nonuniformity and the engine torque Mv, but is opposite to it. Thus, the curves are essentially opposite in phase. That is, when there is a rotational nonuniformity toward higher speed (so-called positive nonuniformity), the electric machine generates a torque to brake the shaft (so-called negative torque), whereas in the case of a rotational nonuniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 1a a by the broken line.

In the mode of operation shown in FIG. 1b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating, mode works like a pure rotational nonuniformity reducer with rapidly varying torque, without generating an additional torque.

Figure 1C:
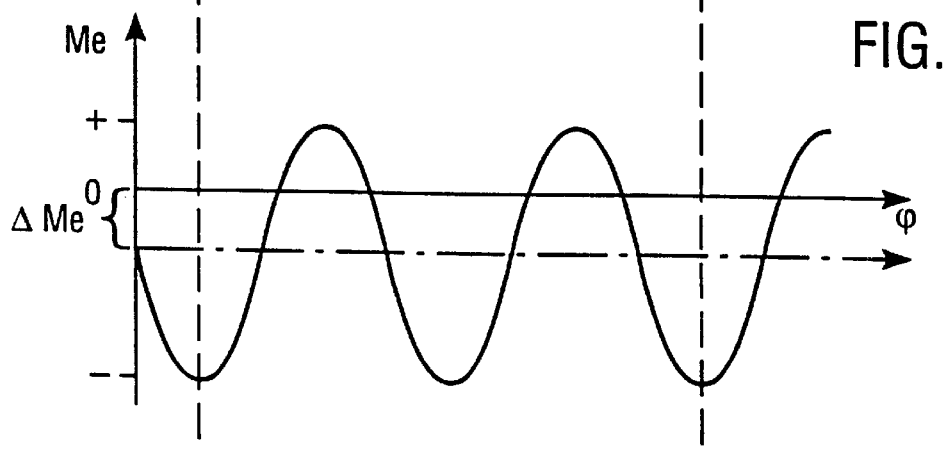

An example of an operating mode of the system modified from the preceding one, with an additional torque, is shown in FIG. 1c: The time course of the total torque Me corresponds to that of FIG. 1b, but it is shifted overall by a particular amount Δ Me (the so-called deviation) in the negative direction. The deviation Δ Me will generally vary slowly, but in the brief time frame represented here of approximately one period of rotation it is constant to a good approximation. The deviation Δ Me here is smaller than the amplitude of the rapid variation of the torque, so that the overall torque Me alternately takes on positive and negative values. Averaged over the rapid torque variation, one obtains a constant torque—Δ Me. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation Δ Me is greater than the amplitude for reducing the rotational nonuniformity, the electric machine will only work as a brake and no longer as a drive, and the braking action will vary in magnitude according to FIG. 1b and 1c in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to support the engine when accelerating the vehicle, for example.

Figure 2:
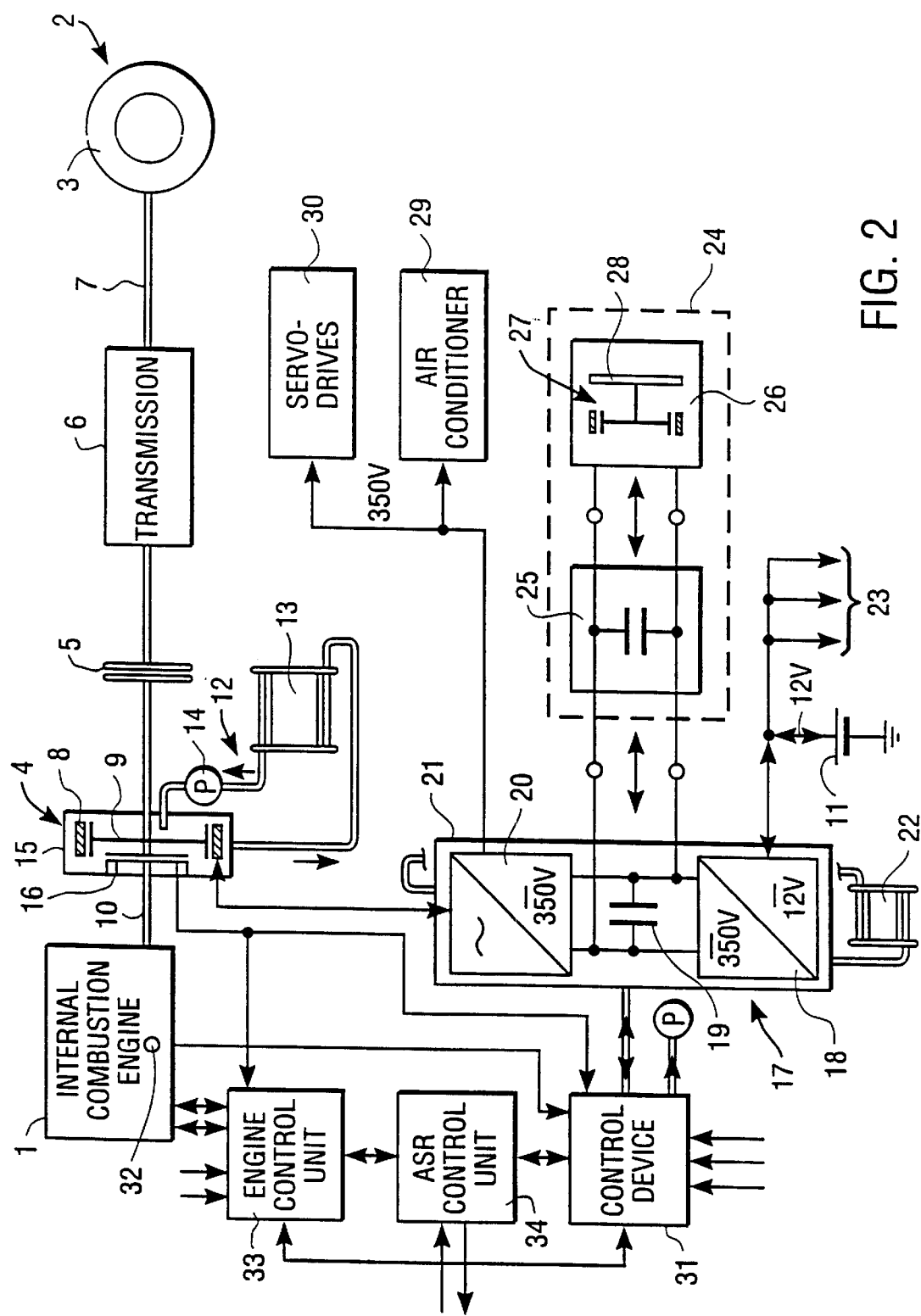
FIG. 2 is a not-to-scale schematic representation of one embodiment of the system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: on the one hand, it functions as a rotational nonuniformity reducer, as has already been explained in connection with FIG. 1. On the other hand, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a starter for the internal combustion engine and thus can also replace a separate starter normally provided in the motor vehicle. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) makes possible this variation in the amount of cooling fluid in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: the stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used.

An inverter 17 provides the stator 8 of the electric machine 4, at a very high clock frequency (e.g., 100 kHz), with sine-evaluated pulse width modulated voltage pulses, which under the action of the machine's inductance basically yield sinusoidal three-phase currents, whose amplitude, frequency and phase are freely selectable.

The inverter 17 is a voltage intermediate-circuit pulse inverter and comprises three subassemblies: a dc voltage converter 18 (input assembly), which converts dc voltage from a low level (here, 12 V) to a higher intermediate circuit level (here, 60 V or 350 V) and back again, an electrical intermediate circuit accumulator 19, here, a capacitor or an arrangement of parallel-switched capacitors, and a machine inverter 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the inverter 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The inverter 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it can also serve to save that energy which accrues during other brake processes mediated by the electric machine 4. Finally, it can take strain off the vehicle's battery 1 when starting the engine 1, since it takes energy only slowly from the battery and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-inverter group. It does not need any very high capacitance for this (e.g., it has 2 $\mu$F), and in fact low lead inductances are more advantageous for speed purposes, which is ensured by the arrangement in the interior of the inverter 17 (and preferably on the same board on which the electronic switches of the machine-inverter 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own inverter-controlled electric machine 27 and a gyrating mass 28 coupled to it. The latter can be formed by a separate flywheel or be integrated in the rotor of the electric machine 27. The moment of inertia of the gyrating mass 28 is preferably 0.001 to 0.1 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the inverter 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the inverter 17 at each moment of time as to the amplitude, frequency, and phase that the alternating voltage generated by; it should have. The control device 31, which can be formed, for example, by a correspondingly programmed microcomputer system first determines the magnitude and the direction of the torque, which the electric machine 4 is supposed to produce at a particular time. It can do this, e.g., by means of a characteristic diagram control system, in that it obtains, as input information from the rotation transformer 16, the angular position of the drive shaft 10, the mean rotary speed at the moment, and possible other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive, train. A combination of automatic and open loop control is also possible. From the value thus determined for the instantaneous rotational nonuniformity, a corresponding (opposite-phase) value is derived for the rapidly changing nominal torque of the electric machine 4, onto which may be additively superimposed a positive or negative additional torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained.

In a second step, the control device 31 determines which amplitude, frequency, and phase of the voltage or current must be provided by the inverter 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the inverter housing 21. In order to keep the lead inductances low and also participate in the boiling bath cooling, however, it is arranged inside the inverter housing 21 in other configurations (not shown).

The control device 31 shares various sensors serving to carry out its control tasks and sensor information derived from them with a motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Furthermore, the control device 31 communicates with a number of other control units: an energy consumption control unit (not shown) indicates how much energy is needed for charging the vehicle battery 11, for supplying the low-voltage consumers 23 and the high-power consumers 29, 30, so that the control device 31 can provide for a corresponding overall thrust adjustment $\Delta$ Me (see FIG. 1c). The motor control unit 33 tells the control device 31 whether the electric machine 4 is supposed to provide acceleration or braking of the vehicle in addition to its vibration diminishing function, so that it can provide a corresponding overall thrust shift $\Delta$ Me and perhaps temporarily switch off the rotational nonuniformity reduction function. Accordingly, an ASR (antislip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. The motor control unit 33 can also implement an automatic start-stop control and tell the control device 31 whether the electric machine 4 should start the engine 1.

Energy obtained during each type of braking is kept in the additional accumulator 24, to be re-used for subsequent powering of the electric machine 4 or diverted to the vehicle battery 11.

Figure 3:
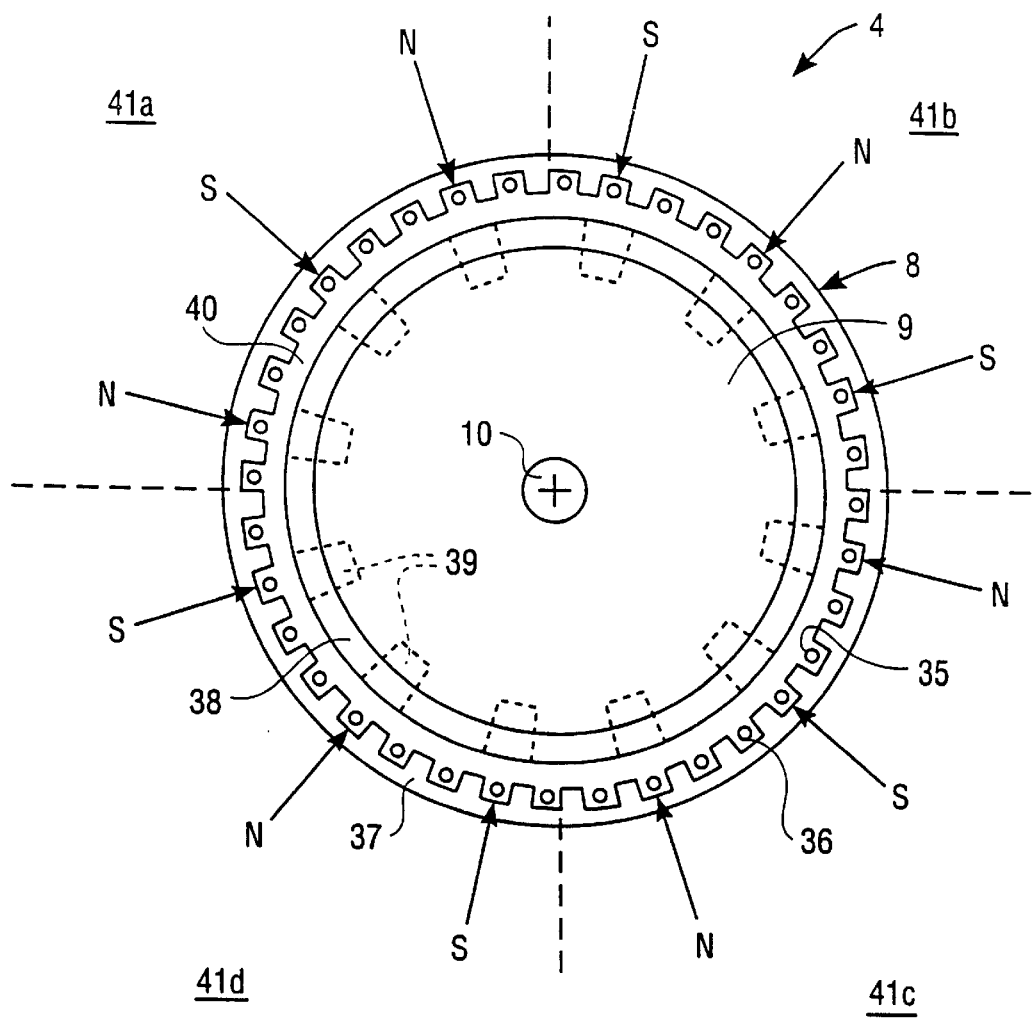
FIG. 3 is a schematic cross sectional representation of an electric machine with plane of sectioning perpendicular to the axial direction in order to illustrate various machine types which can be used in the system.

The electric machine 4, shown more closely in FIG. 3, has no brushes or wiper and is thus free of wear. It has an outer diameter, of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for South Pole) and "N" (for North Pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor poles (reference number 39).

The air gap 40 between rotor 9 and stator 8 is relatively large; its width is 0.25 to 2 2.5 mm, preferably 0.5 to 1.5 mm.

In other configurations (not shown), the rotor is exterior and the stator is interior.

Figure 4:
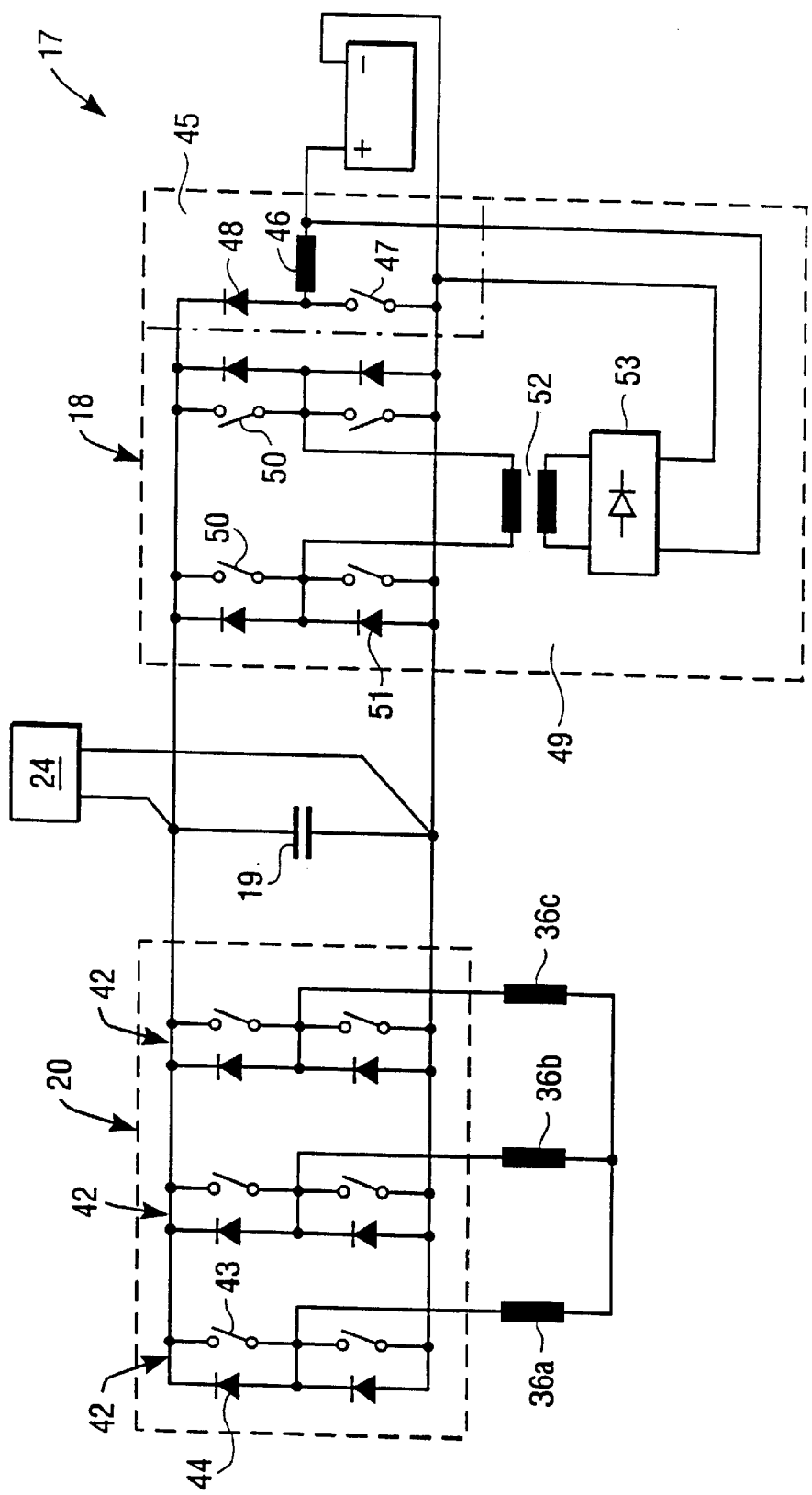
FIG. 4 is a schematic circuit diagram of an inverter used in the system.

FIG. 4 shows a schematic diagram of the inverter 17. One recognizes the intermediate circuit accumulator 19 in the form of a capacitor, which is switched in parallel to the additional accumulator 24 (not shown more closely here). The capacitor symbolizes a parallel connection of several capacitors.

The machine inverter 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36a, 36b, 36c of the three-phase winding 36 at the other side, the three windings 36a, 36b, 36c are joined together.

A freewheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a threephase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47, is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected freewheeling diodes 51. The ends of a primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

The control of the cylinder shut-off (and turn-on) in the embodiment according to FIG. 2 is taken on by the motor control unit 33, while in other embodiments (not shown) a control device common to the drive assembly and the electric machine can provide for this. In both cases, the particular control unit—as soon as conditions are right for a cylinder shut-off—generates a cylinder shut-off signal, which brings about the interruption of the fuel supply to the particular cylinders. As soon as the shut-off conditions no longer exist, the shut-off signal is no longer generated—all cylinders are then supplied with fuel (again).

Figure 5:
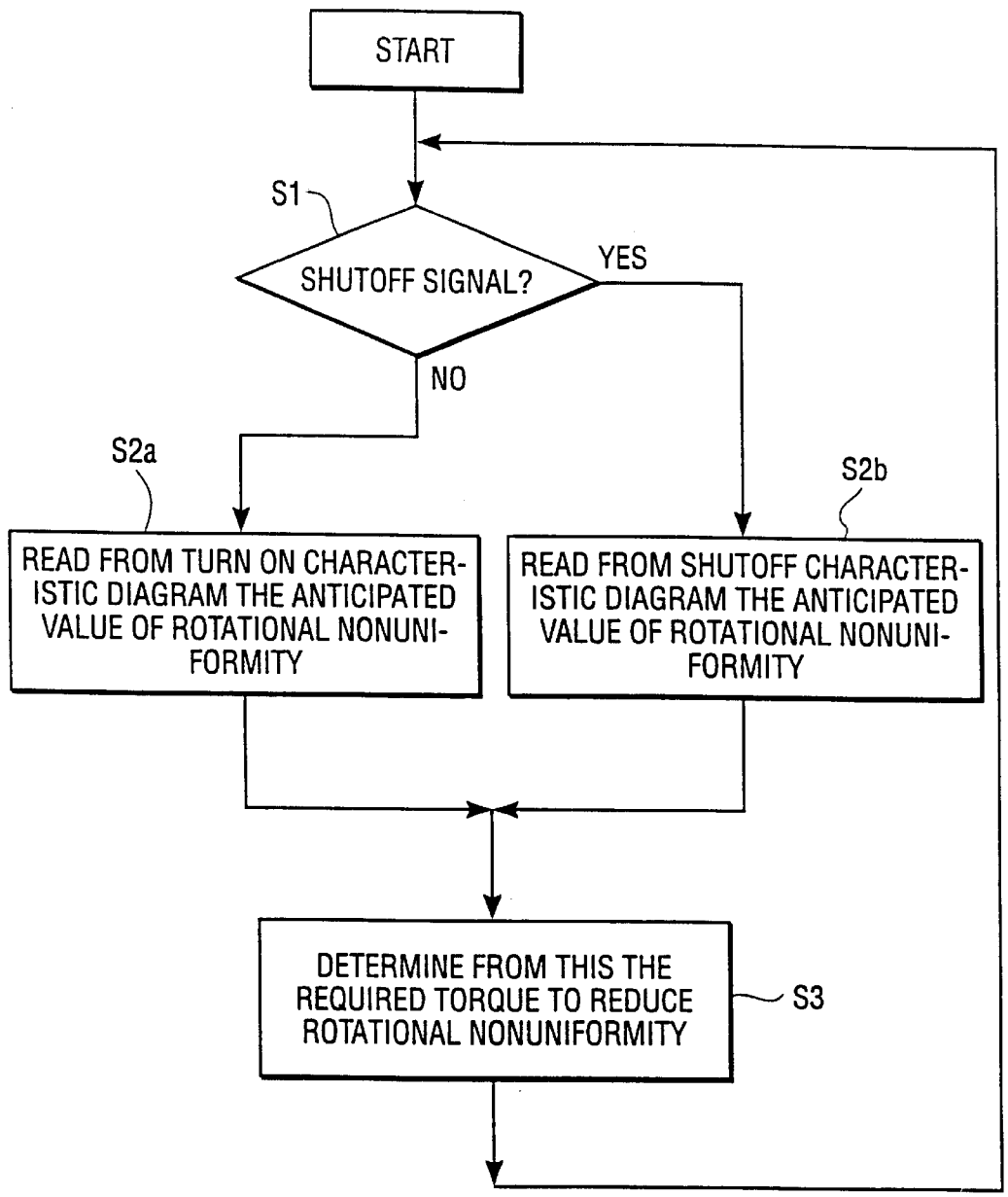
FIG. 5 is a schematic representation of one control sequence in cylinder shut-off mode.

The shut-off signal also intervenes in the control of the electric machine 4, as is illustrated in FIG. 5 for the case of a (possibly adaptive) characteristic-diagram open-loop control or a closed-loop control with (possibly adaptive) characteristic-diagram servocontrol. The control method shown here runs through steps S1 through S3 in a quasi-endless loop.

In step S1, the system queries whether a cylinder shut-off signal is present. If no, the control unit 31 reads in step S2a the rotational nonuniformity values expected for the instantaneous operating state (rotary speed, engine load) from a first characteristic diagram, namely, a characteristic diagram for turn-on mode (full cylinder operation, e.g., six cylinder operation). If yes, however, in step S2b it reads the corresponding values generally—larger in magnitude—from a second characteristic diagram, namely, a characteristic diagram for shut-off mode (partial cylinder operation, e.g., three cylinder operation). Depending on the expected rotational nonuniformity values read out, in step S3 the torque required to suppress this expected rotational nonuniformity is determined and the electric machine 4 is actuated accordingly (as an alternative, instead of the expected rotational nonuniformity, the torque required for its suppression can also already be saved in the characteristic diagrams). Finally, step S1 is performed again and the control process is run through once more.

In a (feedback) closed-loop control with servocontrol, the value taken from the particular characteristic diagram in step S2a and S2b is a servocontrol value, which is used to preset the closed-loop control in step: S3. The (follow-up) control ultimately occurring in step S3 is not shown explicitly in FIG. 7. The transitions from "shut-off signal off" to "shut-off signal on" and back thus produce here a change in the presetting of the closed-loop control, which corresponds to the change in rotational nonuniformity which is expected during the transition.

In other embodiments (not shown), there are several steps in the cylinder shutdown. For example, in the case of an eight-cylinder engine, at first only two cylinders can be shut off in one transition/shut-off region and then four cylinders with further movement into the shut-off region. The above explained control method then occurs respectively with two shut-off signals and three characteristic diagrams.

In all of these embodiments, the user will notice practically nothing about the cylinder shut-off mode or the transitions between turn-on and shut-off mode and back.

Figure 6:
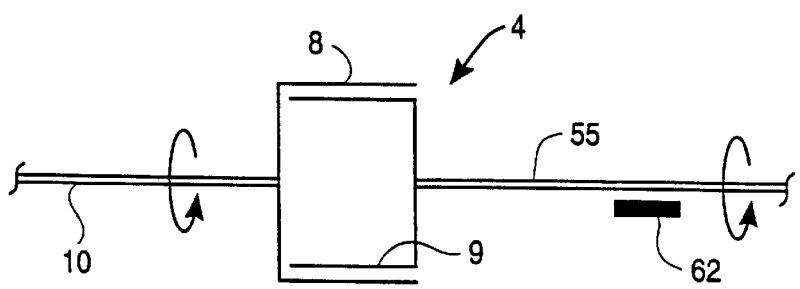
FIG. 6 is a schematic representation of an electric machine with electromagnetic operating units that can rotate.

FIG. 6 shows a single electrical machine 4 having the function of an electromagnetic coupling and/or synchronizing device. It has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed). The electrical machine 4 can thus rotate as a whole in addition to the rotor's rotation; the term "stator" should thus be taken only in a transferred sense, seeing that; it can rotate. Whereas in a stationary electrical machine—such as a rotary field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, and a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

In the function as switching coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

The active transmission synchronization—which can be implemented in configurations of the individual machine 4 even without coupling function—is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9, which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity. The interaction of the reduction of rotational nonuniformity with the cylinder shut-off occurs as in the above-described embodiments with stationary stator, so that reference is made to the above embodiments in this respect.

Additional acceleration or braking is possible with the bridge clutch not engaged by generating appropriate torques—or in other words—less or more clutch slip. The electric machine 4 can be involved in an ASR control such that when the drive wheel slip is too large the clutch slip is momentarily increased and thus the moment applied to the drive wheels is reduced. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time, such that it produces a braking moment, i.e., frictional connection between the rotor 9 and the stator 8'. In this way, the rotor 9 with the takeoff shaft 55 and the stator 8' with the drive shaft 10 are quickly brought to a common mean speed (e.g., 800 rpm) and the engine 1 is started.

What is claimed is:

1. Drive system, particularly for a motorized vehicle, comprising:

a multi-cylinder combustion engine;

a device (31 or 33) to switch off at least one cylinder of the combustion engine (1);

an electric rotating field motor (4) to provide active damping of rotational non-uniformities by creation of varying torques, whereby the electric motor (4) is active for damping of the greater rotational non-uniformity during operation with cylinder(s) switched off;

at least one alternating current rectifier (17 used to create the voltages and/or currents of variable frequency, amplitude and phase required for the magnetic fields of the electric motor (4)' whereby the alternating current rectifier (17) features an intermediary circuit is equipped with an energy buffer (19, 24) for intermediary storage of energy arising during active damping;

whereby both the energy production from the intermediary circuit during engine operation of the electric motor and the energy storage into the intermediary circuit during generator operation occur at the higher voltage level.

2. Drive system as in claim 1 in which the electric motor (4) alters its damping operation upon transfer of the system from normal mode to switched-off cylinder mode sand back.

3. Drive system as in claim 2 in which the damping increases upon transfer of the system from normal mode to switched-off cylinder mode, and decreases upon transfer from switched-off cylinder mode to normal mode.

4. Drive system as in claim 2 in which the electric motor (4) alters its damping operation without input of control information on the basis of recognition of momentary rotational non-uniformities from the system which switches the cylinders on or off or upon transfer of the system from normal mode to switched-off cylinder mode and back.

5. Drive system as in claim 2 in which control information used to control the transfer from normal mode to switched-off cylinder mode, or the reverse, brings about the alteration in damping effect.

6. Drive system as in claim 1 which the electric motor (4) can add a positive or negative torque to the changing torques used for damping rotational non-uniformities for the additional purpose of creating drive force and braking, or generating force.

7. Drive system as in claim 1 in which the electric motor (4) acts upon the drive shaft (10) of the combustion engine (1) or on a shaft connected or connectable to it by a coupling, to create active damping of rotational non-uniformities.

8. Drive system as in claim 7 in which the electric motor (4) can create or support acceleration or braking of the drive shaft (10) or of the shaft in order to accelerate or brake the vehicle or to reduce slippage of a drive wheel during braking within the scope of an anti-slip system.

9. Drive system as in claim 7 in which the electric motor (4) can create or support acceleration or braking of the drive shaft (10) or of the shaft in order to accelerate or brake the vehicle and to reduce slippage of the drive wheel during braking within the scope of an anti-slip drive system.

10. Drive system as in claim 1 in which the electric motor (4) also performs the function of the starter for the combustion engine (1) or the function of a generator for production of current.

11. Drive system as in claim 1 in which the electric motor (4) also performs the function of a starter for the combustion engine (1) and the function of a generator for production of current.

12. Drive system as in claim 1 in which auxiliary motors may be driven at a high voltage level from the intermediate circuit.

13. Drive system as in claim 12 in which the auxiliary motors are one or more of the following group: air conditioning compressors (29), power assists (30) and pumps.

14. Drive system as in claim 1 in which the electric motor (4) acts in the drive train (2) as an electromagnetic clutch or as in an active transmission synchronization device, or as a component thereof.

15. Drive system as in claim 1 in which the electric motor (4) acts in the drive train (2) as an electromagnetic clutch and as an active transmission synchronization device, or as a component thereof.

* * * * *